United States Patent Office 2,927,758
Patented Mar. 8, 1960

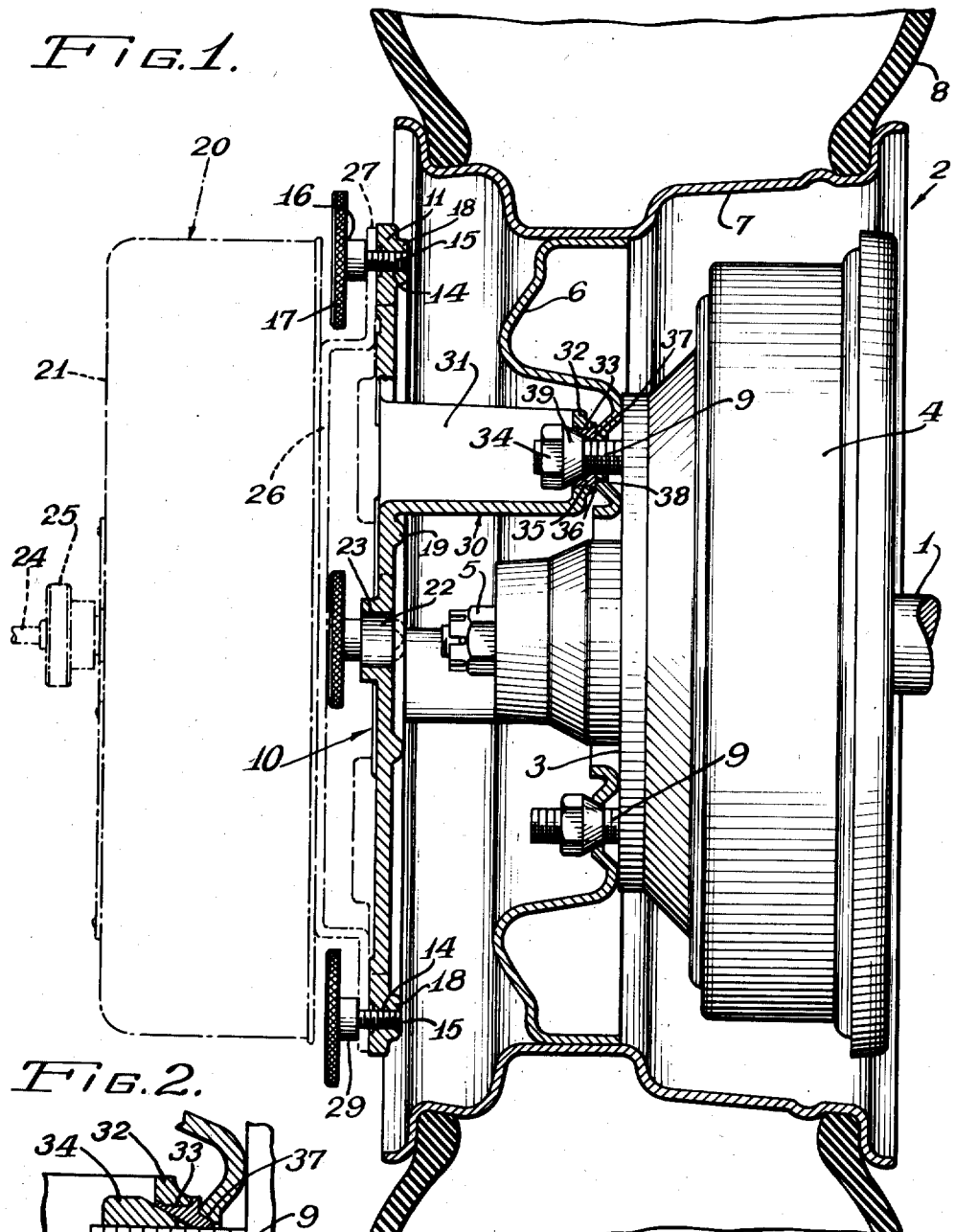
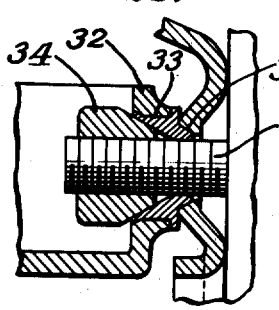

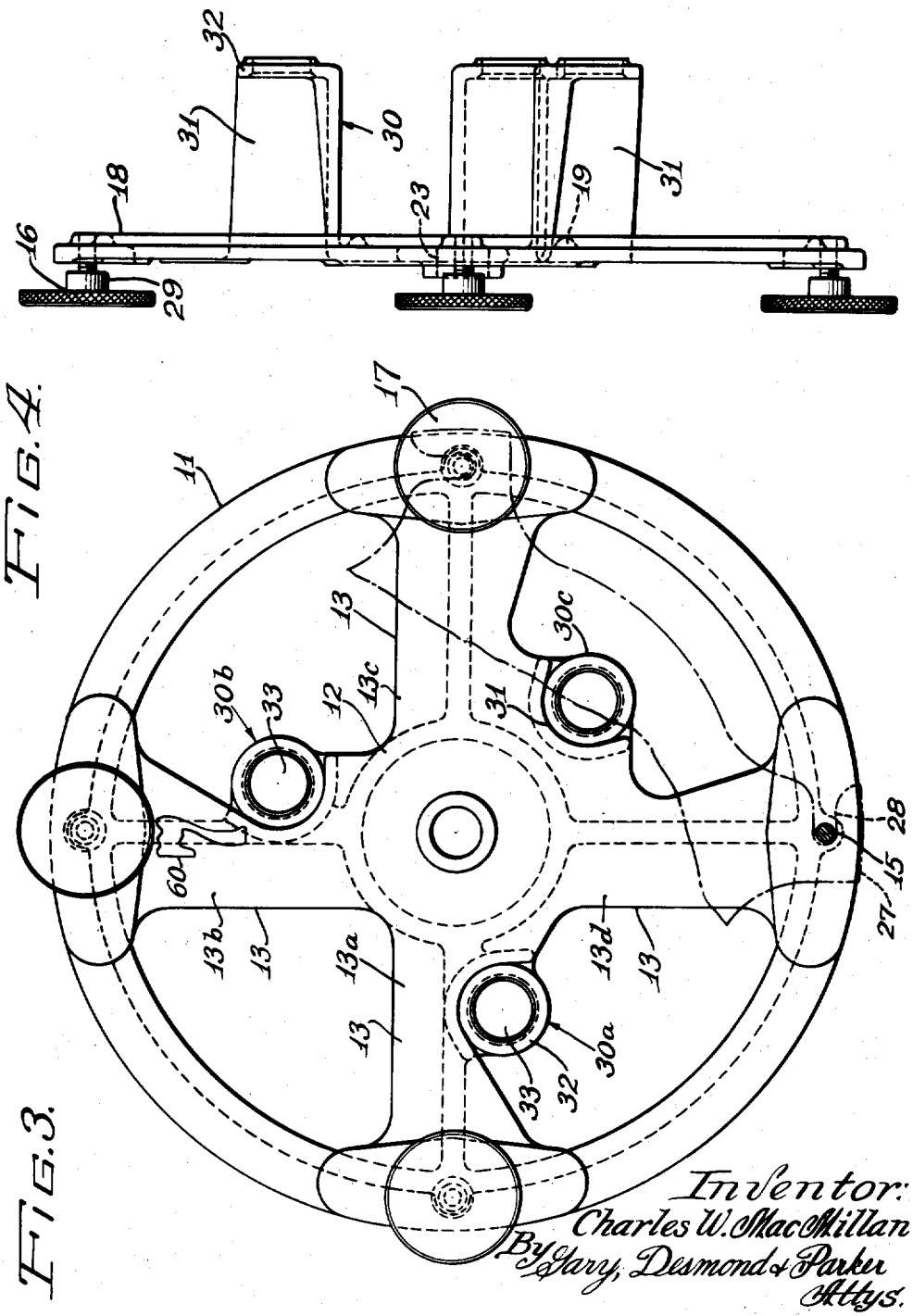

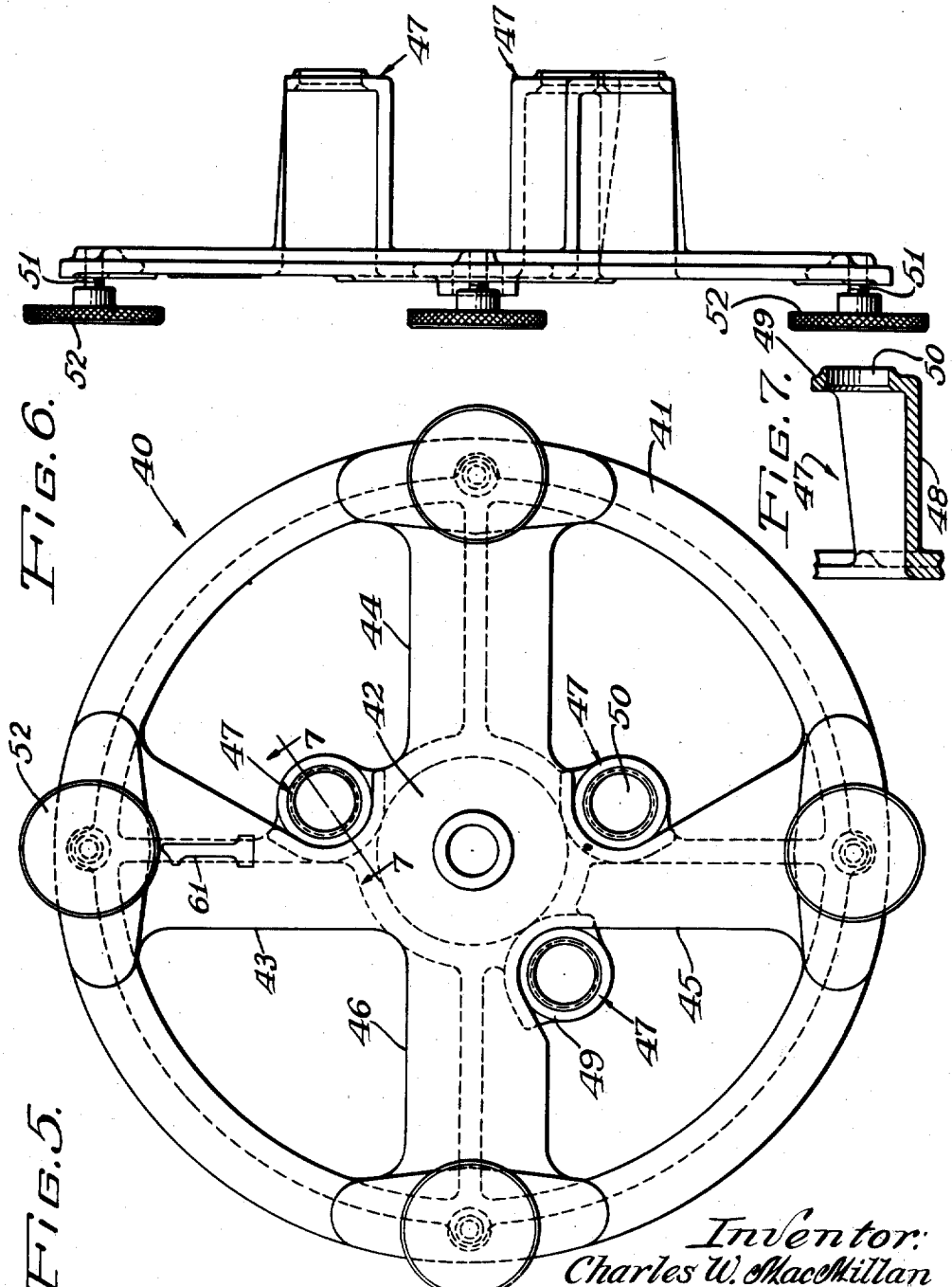

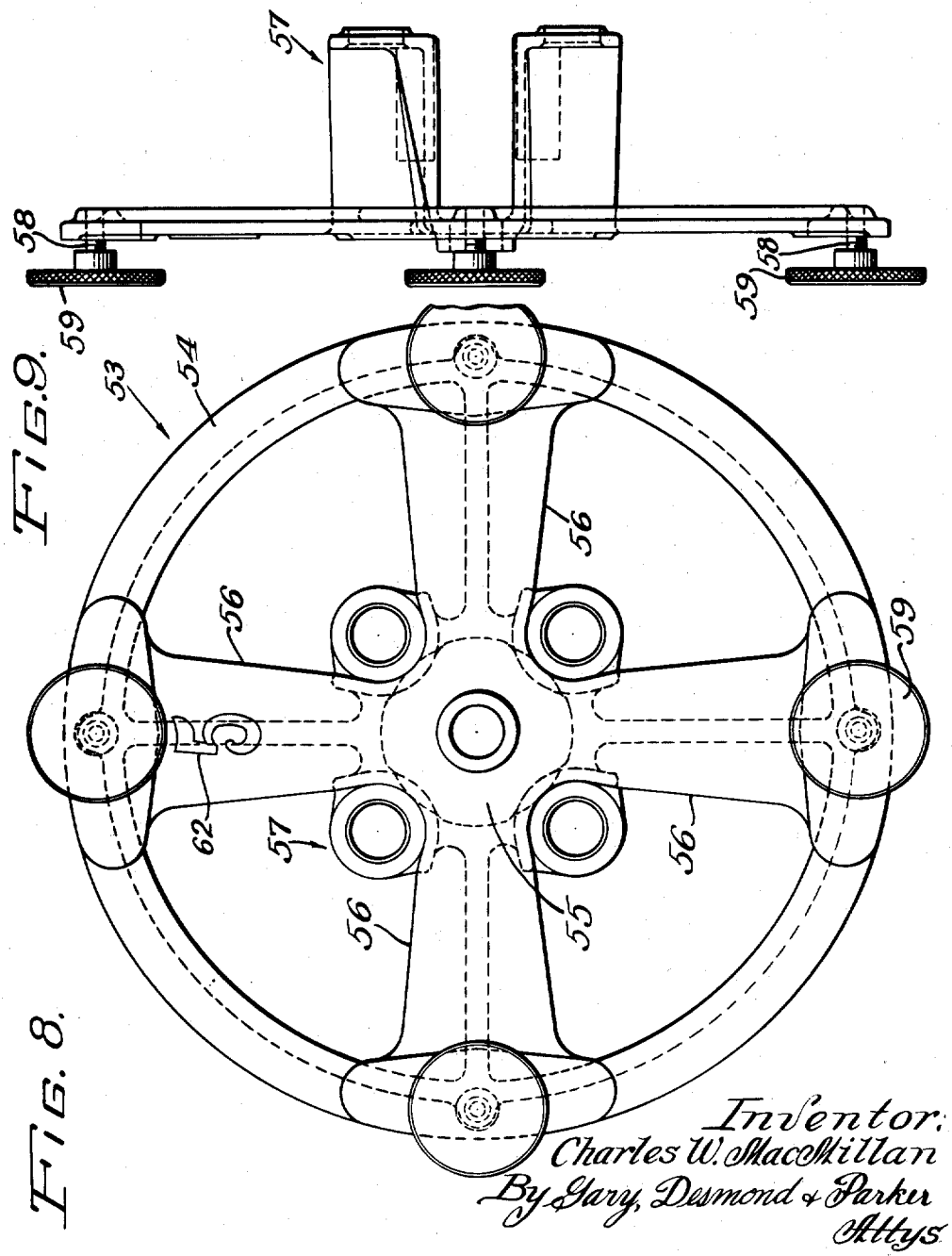

2,927,758
ADAPTER FOR MOUNTING A TEST DEVICE UPON AN AUTOMOBILE WHEEL

Charles W. MacMillan, Rock Island, Ill., assignor to Bear Manufacturing Company, Rock Island, Ill., a corporation of Delaware Application January 8, 1957, Serial No. 633,133

6 Claims. (Cl. 248—205)

This invention relates to improvements in an adapter for the mounting of test apparatus upon an automobile wheel, the device being characterized in that it may be employed to mount such test apparatus in a position coaxial with the wheel and in a plane substantially parallel to the plane of the wheel, that is, a plane at right-angles to the axis of rotation of the wheel.

In the art of statically and dynamically balancing automobile wheels, a balance testing device, of the type which may be mounted upon the wheel without removing the wheel from the vehicle, is frequently used. Such a device, to be effective must be mounted coaxially with the wheel and must rotate with the wheel in a plane substantially parallel to the plane of rotation of the wheel. A convenient means for mounting the test device upon the wheel comprises the usual stud bolts employed to secure the wheel proper to the bearing portion thereof. However, said bolts, by virtue of their position, offset inwardly from the rim and tire of the wheel are not readily accessible for such use.

As a feature of the present invention an adapter is contemplated which functions conveniently to mount a balance testing device, of the type described, upon the wheel, employing the stud bolts as securing means.

Briefly described, the device embodying the present invention comprises a ring member and a central hub member connected to the ring member by radially extending spokes, the spokes and hub member carrying fastening aligning elements which extend transversely to the plane of the ring member, hub member and spokes, the remote end portions of said elements functioning as sockets for the reception of the wheel studs which may be fastened in said sockets.

Inasmuch as conventional automobile wheels carry different numbers of, and angularly differently spaced, studs and that said studs may be mounted upon different radii, the present invention may take different forms, a typical number of which are shown and described herein.

The objects, advantages and features of the present invention will be more apparent from the accompanying drawings and following detailed description.

In the drawings,

Fig. 1 is a sectional elevational view of a typical automobile wheel, the adapter comprising the present invention, also being shown in section, securing to the wheel a conventional balance testing device, shown in broken lines.

Fig. 2 is an enlarged detailed sectional view of a centering collar of a form slightly modified from the form shown in Fig. 1.

Fig. 3 is a front elevational view of the adapter shown in Fig. 1.

Fig. 4 is a side elevational view of the device shown in Fig. 3, the devices illustrated in Figs. 1, 3 and 4 being adaptable for use upon a six-stud wheel, the studs being on a predetermined radius.

Fig. 5 is a front elevational view of a modified form of adapter suitable for a five-stud wheel.

Fig. 6 is a side elevational view of the device shown in Fig. 5.

Fig. 7 is a detailed sectional view taken on line 7—7 of Fig. 5 showing one of the sockets employed.

Fig. 8 is a front elevational view of another modified form of the invention, the illustrated device being suitable for a four-stud wheel.

Fig. 9 is a side elevational view of the device shown in Fig. 8.

Referring in detail to the drawings, 1 indicates the spindle for the front wheel 2 of an automobile. The bearing portion 3 which carries brake drum 4 is secured to the spindle 1 by the usual nut 5. The remaining portion of the wheel 2 comprises the disc or web portion 6 and rim 7 which holds tire 8. Although the adapter comprising the present invention is described and shown in Fig. 1 as being applied to a front wheel of the vehicle, it is to be understood that the device may also be employed with a rear wheel of the vehicle in the same fashion as will be hereinafter more fully described in conjunction with its use upon front wheel 2.

The hub portion 3 of the wheel 2 carries mounting studs 9 of conventional form and in Fig. 1 the wheel 2 carries six such studs spaced 60° from each other on a circle of predetermined radius. The adapter shown in Figs. 1, 3 and 4 is suitable for a wheel of this type.

The adapter comprising the present invention is shown generally at 10 and comprises an annular rim portion 11 and a central hub portion 12, the latter being connected to the rim portion by radially extending spokes 13, the rim portion 11, the hub portion 12 and spokes 13 being disposed in a substantially common plane.

The rim portion 11, preferably adjacent the juncture of the spokes with the rim, is provided with threaded bores 14 adapted for the reception of mounting screws 15 which are threadedly engaged in said bores, the outer ends of said screws carrying hand wheels or knobs 16 whereby the screws may be rotated in said bores. For convenience, the wheels 16 may have knurled edges 17 to facilitate their manipulation.

To reinforce the structure 10 and to prevent flexing or warping thereof, the rim portion is constructed of relatively enlarged thickness, as shown best at 18 in Fig. 1 and the hub portion 12 carries an integral annular bead 19.

The reference numeral 20, in Fig. 1, indicates a conventional balance testing device which is adapted to be mounted on wheel 2 to test the static and dynamic balance thereof. The balance tester 20 comprises a substantially cylindrical housing 21 which contains the usual testing mechanism. A centering shaft 22 projects from the axial center of the housing and is loosely received in aperture 23 provided in the center of hub 12. At the opposite side of the housing 21 a manipulating shaft 24 projects axially from the housing, said shaft carrying a manipulating knob 25. The housing 21 is carried by a spider 26 which terminates in four spaced offset mounting arms 27, each arm being provided with a slot 28 whereby the arms may respectively engage screws 15. The hand wheels 16 each carry a boss 29 which when screws 15 are positioned in slots 28, may be caused to firmly bear upon the arms 27. In this fashion the tester 20 is mounted upon the adapter in a substantially coaxial and parallel position therewith.

To secure the adapter 10 to the wheel 2, socket elements 30 are employed. In the form of the invention illustrated in Figs. 1, 3 and 4, three such socket elements are used. Inasmuch as the adapter 10 is suitable for a six-stud wheel, the socket elements 30 are angularly spaced 120° from each other and each socket is engageable with an alternate stud 9, as will be hereinafter more fully described.

In order to preserve the static and dynamic balance of the adapter per se the sockets, which are preferably formed integral with the adapter, are offset with respect to spokes in the manner illustrated in Fig. 3, that is, socket 30a is offset with respect to spoke 13a; socket 30b is offset on the remote side of spoke 13b from socket 30a, and socket 30c is disposed substantially midway between spokes 13c and 13d. Thus, although the circle upon which the sockets 30 are disposed is concentric with the axis from which the spokes radiate, the pattern of the sockets is unsymmetrical with respect to the pattern of the spokes.

Each socket 30 comprises a substantially semi-cylindrical or warped projection 31 which extends transversely to the plane of the adapter, each projection terminating in a substantially circular flange 32 provided with a central aperture 33. In employing the adapter 10 the flanges 32 are disposed in embracing relationship over alternate studs 9 and lug nuts 34 are threaded upon the studs 9. The apertures 33 are enlarged relative to the diameter of the studs to promote proper parallel positioning of the adapter upon the wheel.

To facilitate such proper positioning an insert 35 is disposed in embracing relationship with each stud. Each insert carries a marginal flange 36 which on one face abuts the outer face of flange 32 and on the opposite face abuts struck-up portion 37 which defines hole 38 in the wheel disc or web 6. The end portion of the insert 35 opposite flange 36 is tapered on its inner periphery and is adapted to register with the tapered portion 39 of lug nut 34.

The arrangement is such that when the lug nuts 34 associated with the projecting sockets 30 are tightened, the forces involved tend to center each aperture with respect to the axis of each stud, the insert-nut arrangement functioning as a socket joint.

It can readily be seen, by reference to Fig. 1, that by the relationship of the socket elements 30 with respect to the plane of the adapter, the mounting face of the adapter for the test device 20 is spaced outwardly from the inwardly indented face of the web or disc 6 and in view of the fact that nut 34, embraced by the semi-cylindrical or warped projection 31 is accessible from the front of the adapter by the use of a conventional socket wrench, the adapter readily permits the mounting of the tester 20 upon the normally inconveniently accessible studs 9.

Referring particularly to Figs. 5, 6 and 7, a modification of the invention is shown, the device illustrated being suitable for mounting upon a wheel having five stud bolts. In the form of the invention illustrated, reference numeral 40 indicates generally the modified adapter. The adapter 40 comprises a rim portion 41 and a hub portion 42, both similar to the rim portion 11 and hub portion 12 of the adapter 10, hereinbefore described. The rim portion 41 and hub portion 42 are connected by radially extending spokes 43, 44, 45 and 46. To secure a substantial static and dynamic balance of the adapter, spokes 43 and 45 are constructed somewhat similar to each other and each carries, at its juncture with the hub portion 42 a connecting element 47, constructed similar to the elements 30. The spokes 44 and 46 are different from spokes 43 and 45, spoke 46 carrying a connecting element 47 adjacent its juncture with the hub portion 42. The connecting elements 47, one of which is shown in detail in Fig. 7, comprises a semi-cylindrical or semi-tubular extension 48 which terminates at its remote end in a flange 49, the latter being provided with a stud-embracing aperture 50. The adapter 40 may also carry screws 51 having knobs 52 whereby the adapter may carry a test device, such as the tester 20.

The angular disposition of the elements 47 are such as to conform with those of the five studs upon the automobile wheel, and thus said more or less normally inaccessible studs are rendered convenient for the securing of the test instrument upon the wheel.

Referring particularly to Figs. 8 and 9 another modification of the invention is shown, the device illustrated being suitable for mounting upon a wheel having four stud bolts. In the form of the invention illustrated in Figs. 8 and 9, reference numeral 53 indicates generally the modified adapter. The adapter 53 comprises a rim portion 54 and hub portion 55 similar to the respective portions heretofore described. The rim portion and the hub portion are connected by spokes 56 all of which are similar. Adjacent the juncture of the respective spokes, connecting elements 57 are carried, the connecting elements being similar to connecting elements 30 and 47 hereinbefore described. Fastening screws 58 having knobs 59 are carried by the adapter 53 for securing a tester thereto.

In view of the fact that a connecting element 57 is provided for each of the four studs on the wheel, said elements are disposed symmetrically and since the spokes 56 are all similar the adapter is substantially statically and dynamically balanced.

Since the radius of the stud bolt circle on different wheels may be different, a combination of different adapters must be carried by one carrying out balance testing services. However, except for said different radii, the adapters may all take the form herein illustrated and described. For convenience, where a number of said adapters are stocked by one rendering wheel balancing services, identifying numbers 60, 61 and 62 may be formed upon the different adapters.

It will be apparent that many modifications, which do not depart from the spirit of the present invention, may be made by those skilled in the art and, hence, it is not intended that the invention be limited to the exact details shown and described except as necessitated by the appended claims.

I claim as my invention:

1. An adapter for securing a test device upon an automobile wheel in coaxial relationship to said wheel wherein said wheel is of the type having stud bolts thereon in a recessed portion of the face thereof relative to the rim and tire of the wheel, said adapter comprising, a substantially planar frame of a diameter substantially at least as large as the diameter of the test device, said frame having opposite faces, means on the front face of said frame adjacent the outer periphery thereof for securing a test device upon said frame in substantially plane-parallel and coaxial relationship with the wheel under test when the frame is mounted on the wheel, a plurality of substantially tubular connecting elements carried by said frame and projecting transversely to the rear face of the frame, a flange carried by the end of each connecting element remote from the frame, said flange being provided with an aperture through which a wheel stud bolt may project, the frame being provided with an aperture greater in area than the area of the aperture in said flange, said frame aperture being adjacent each connecting element to permit access to the projecting end of each stud bolt from the front face thereof to secure a nut thereon and lock the respective flanges upon said bolts.

2. An adapter for securing a test device upon an automobile wheel in coaxial relationship to said wheel wherein said wheel is of the type having stud bolts thereon in a recessed portion of the face thereof relative to the rim and tire of the wheel, said adapter comprising, a substantially planar frame of a diameter substantially at least as large as the diameter of the test device, said frame having opposite faces, means on the front face of said frame for removably securing a test device upon said frame in substantially plane-parallel and coaxial relationship with the wheel under test when the frame is mounted on the wheel, a plurality of connecting elements carried by said frame and projecting transversely to the rear face of the frame, each of the connecting elements being of a length substantially equal to the distance between the recessed portion of the wheel and the plane of the outer edge of the rim of the wheel, each of said connecting elements comprising a semi-tubular projection, a flange carried by the end of each semi-tubular projection remote from the frame, said flange being provided with an aperture through which a wheel stud bolt may project, the frame being provided with an aperture of greater diameter than the diameter of the flange aperture, said frame aperture being adjacent each connecting element to permit access through said semi-tubular projection to the projecting end of each stud bolt to secure a nut thereon and lock the respective flanges upon said bolts.

3. An adapter for securing a test device upon an automobile wheel in coaxial relationship to said wheel wherein said wheel is of the type having stud bolts thereon in a recessed portion of the face thereof relative to the rim and tire of the wheel, said adapter comprising, a substantially planar frame having opposite faces, means on the front face of said frame for securing a test device upon said frame in substantially plane-parallel and coaxial relationship with the wheel under test when the frame is mounted on the wheel, three connecting elements carried by said frame in equiangular spaced relationship to each other and projecting transversely to the opposite face of the frame, a flange carried by the remote end of each connecting element provided with an aperture through which a wheel stud bolt may project, the frame being apertured adjacent each connecting element, the area of said frame aperture being substantially greater than the area of said flange aperture to permit access to the projecting end of each stud bolt to secure a nut thereon and lock the respective flanges upon said bolts, the connecting elements being of such length as to dispose the plane of the frame substantially flush with the plane of the outer edge of the rim.

4. An adapter for securing a test device upon an automobile wheel in coaxial relationship to said wheel wherein said wheel is of the type having stud bolts thereon in a recessed portion of the face thereof relative to the rim and tire of the wheel, said adapter comprising, a substantially planar frame having opposite faces, means on the front face of said frame for securing a test device upon said frame in substantially plane-parallel and coaxial relationship with the wheel under test when the frame is mounted on the wheel, four connecting elements carried by said frame in equiangular spaced relationship to each other and projecting transversely to the opposite face of the frame, a flange carried by the remote end of each connecting element provided with an aperture through which a wheel stud bolt may project, the frame being apertured adjacent each connecting element, the area of said frame aperture being substantially greater than the area of said flange aperture to permit access to the projecting end of each stud bolt to secure a nut thereon and lock the respective flanges upon said bolts, the connecting elements being of such length as to dispose the plane of the frame substantially flush with the plane of the outer edge of the rim.

5. An adapter for securing a test device upon an automobile wheel in coaxial relationship to said wheel wherein said wheel is of the type having stud bolts thereon in a recessed portion of the face thereof relative to the rim and tire of the wheel, said adapter comprising, a substantially planar frame having opposite faces, means on the front face of said frame for securing a test device upon said frame in substantially plane-parallel and coaxial relationship with the wheel under test when the frame is mounted on the wheel, three angularly spaced connecting elements carried by said frame and projecting transversely to the opposite face of the frame, a flange carried by the remote end of each connecting element at substantialy right-angles thereto, said flange being provided with an aperture through which a wheel stud bolt may project, the frame being apertured adjacent each connecting element, the area of said frame aperture being substantially greater than the area of said flange aperture to permit access to the projecting end of each stud bolt to secure a nut thereon and lock the respective flanges upon said bolts, the connecting elements being of such length as to dispose the plane of the frame substantially flush with the plane of the outer edge of the rim.

6. A substantially dynamic and statically balanced adapter for securing a balance test device upon an automobile wheel in coaxial relationship to said wheel wherein said wheel is of the type having stud bolts thereon in a recessed portion of the face thereof relative to the rim and tire of the wheel, said adapter comprising, a substantially planar frame having opposite faces, means on the front face of said frame adjacent the outer periphery thereof for securing a test device upon said frame in substantially plane-parallel and coaxial relationship with the wheel under test when the frame is mounted on the wheel, a plurality of connecting elements carried by said frame and projecting transversely to the rear face of the frame, a flange carried by the remote end of each connecting element at substantially right-angles thereto, said flange being provided with an aperture through which a wheel stud bolt may project, the frame being apertured adjacent each connecting element to permit access to the projecting end of each stud bolt to secure a nut thereon and lock the respective flanges upon said bolts, the frame aperture being of substantially greater area than the area of the flange aperture.

References Cited in the file of this patent

UNITED STATES PATENTS

| | | |
|---|---|---|
| 629,408 | Williston | July 25, 1899 |
| 2,675,200 | Wohlforth | Apr. 13, 1954 |
| 2,731,833 | Jones | Jan. 24, 1956 |